United States Patent
Fukuda et al.

(10) Patent No.: US 6,424,915 B1
(45) Date of Patent: Jul. 23, 2002

(54) SYSTEM FOR DETERMINING THE HEADING AND/OR ATTITUDE OF A BODY

(75) Inventors: Masaru Fukuda; Sadao Sato; Hiroyuki Toda, all of Nishinomiya (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 0 days.

(21) Appl. No.: 09/870,628

(22) Filed: Jun. 1, 2001

(30) Foreign Application Priority Data

Jun. 1, 2000 (JP) .......................... 2000-164684

(51) Int. Cl.[7] .............................. G01C 19/00; G01S 5/02
(52) U.S. Cl. .......................... 701/214; 701/220; 701/4; 701/13
(58) Field of Search ................................. 701/214, 3, 4, 701/7, 13, 207, 213, 220, 221, 216; 342/357, 442; 375/207; 340/34; 244/165, 169, 176

(56) References Cited

U.S. PATENT DOCUMENTS

| | | | |
|---|---|---|---|
| 5,757,316 A | | 5/1998 | Buchler |
| 6,023,988 A | * | 2/2000 | Smith et al. ................. 701/214 |
| 6,088,653 A | * | 7/2000 | Smith et al. ................. 701/214 |
| 6,154,691 A | * | 11/2000 | Baile .............................. 701/4 |
| 6,161,062 A | | 12/2000 | Sicre et al. |
| 6,167,347 A | | 12/2000 | Lin |
| 6,246,960 B1 | * | 6/2001 | Lin ............................. 701/220 |
| 6,292,750 B1 | * | 9/2001 | Lin ............................. 701/207 |
| 6,311,129 B1 | * | 10/2001 | Lin ............................. 701/214 |
| 6,317,688 B1 | * | 11/2001 | Bruckner et al. ........... 701/214 |

FOREIGN PATENT DOCUMENTS

| | | |
|---|---|---|
| EP | 0 763 749 A1 | 3/1997 |
| EP | 1 014 104 A2 | 6/2000 |
| WO | 00/48014 | 8/2000 |

* cited by examiner

*Primary Examiner*—Richard M. Camby
(74) *Attorney, Agent, or Firm*—Birch, Stewart, Kolasch & Birch, LLP (57) ABSTRACT

A system for determining the heading and/or attitude of a body receives radio waves from a plurality of position-fixing satellites using at least three antennas fixedly mounted at different positions of the body. To reliably obtain integer ambiguity solutions of carrier phases of the radio waves in a shorter time, the system directly determines integer ambiguities from attitude angle data obtained by an IMU attitude processing section when the integer ambiguities are to be redetermined in the event of an interruption of the received radio waves or a change in the combination of satellites to be used. This system provides a user with highly accurate uninterrupted heading and/or attitude angle information.

4 Claims, 4 Drawing Sheets

SYSTEM FOR DETERMINING THE HEADING AND/OR ATTITUDE OF A BODY

BACKGROUND OF THE INVENTION AND RELATED ART STATEMENT

The present invention relates to a system for determining the heading and/or attitude of a body moving or stationary, such as an aircraft or a vessel.

There is being developed an attitude determining system (ADS) which receives radio waves transmitted from a plurality of position-fixing satellites by a plurality of antennas disposed at specific positions of a body with one of the antennas being used as a reference antenna, measures the phases of carrier signals of the radio waves, determines the relative geometric relationship of the onboard antennas by determining the relative positions of the antennas with respect to the reference antenna, and thereby measures the three-dimensional attitude of the body.

Another example of a conventional system for determining the attitude of a body utilizes an inertial measurement unit (IMU) sensor like a rate gyro which detects angular velocity.

The conventional ADS determines integer ambiguities involved in a double difference of carrier phase or in a single difference of carrier phase by observing the double difference of carrier phase or the single difference of carrier phase between the carrier phases of the radio waves transmitted from the position-fixing satellites to determine the positions of the antennas relative to the reference antenna. In the conventional integer ambiguity solution method, however, there arise errors in solution statistically and stochastically with the probability of finding a correct integer ambiguity solution being 85% to 95%, for example, wherein the time required for obtaining the integer ambiguity solution greatly depends on observation noise level and baseline lengths (i.e., the lengths between the reference antenna and the other antennas whose relative positions should be determined). Under an ordinary noise level, 30 seconds to a few minutes are required on average to obtain an integer ambiguity solution when the baseline lengths are approximately 1 m. When the noise level is high, it has occasionally be impossible to obtain an integer ambiguity solution even after 10 minutes of observation, for example.

In practical situations, it becomes necessary to obtain integer ambiguity solutions when the combination of satellites used for position fix is altered or when a cycle slip (a situation in which information on integer components of a value in a counter for counting the carrier phases is lost due to inability of a coherent delay lock loop of a carrier reconstruction circuit to track) occurs due to noise, for example. Therefore, if the time for determining the integer ambiguity solution is long, an attitude output for a user would be frequently interrupted for impermissibly long periods of time. Also, if the rate of correct integer ambiguity solutions is low, the system would output unreliable attitude information. This has been a major bottleneck for practical application of the conventional ADS.

In an attitude determining system using the aforementioned IMU sensor, on the other hand, a major problem has been the accumulation of errors which occurs due to the fact that the system determines the three-dimensional attitude of a body by integrating its angular velocity components in the direction of each of three axes x, y, z.

Previous efforts to overcome the aforementioned problems by integrating the conventional ADS and IMU system are found in U.S. Pat. No. 5,349,531, in which attitude information is interpolated with attitude determination results obtained from an output of an IMU sensor when an attitude data output from the ADS is interrupted. The attitude determining system of U.S. Pat. No. 4,754,280 basically determines the attitude of a body based on the output of the IMU sensor and outputs it as attitude information and utilizes the attitude determination results obtained by the IMU system just for estimating and removing IMU sensor errors.

When a widely available low-cost IMU sensor is used in a system for determining the attitude of a body by means of the IMU sensor, however, significant errors would occur, making it impossible to perform accurate error modeling. Therefore, even if the IMU sensor error is estimated and compensated for, it can not be completely removed. Thus, when a maximum permissible error is about 1°, backup time ensured by the IMU is approximately 30 to 60 seconds at the maximum. This means that the ADS should restore an reliable attitude data output within this backup time, so that the conventional ADS/IMU integrated system has not been suited for practical use.

Also, neither of the aforementioned U.S. Patents are intended to solve the aforementioned problems involved in obtaining an integer ambiguity solution of a single difference of carrier phase or a double difference of carrier phase in the ADS.

SUMMARY OF THE INVENTION

In view of the foregoing, it is an object of the invention to provide an attitude determining system which can reliably determine an integer ambiguity solution in a shorter time using an output of an IMU sensor.

Another object of the invention is to provide a measuring system which can obtain an integer ambiguity based on an output of an IMU sensor.

The present invention makes it possible to determine integer ambiguities of single differences of carrier phase or double differences of carrier phase observed when determining relative positions of multiple antennas based on attitude angles of a body obtained by means of an IMU sensor to thereby shorten the time required for obtaining an integer ambiguity solution, so that attitude determining results can be continuously output to a user even if cycle slips frequently occur.

According to one aspect of the present invention, a system for determining the heading and/or attitude of a body comprises at least three antennas which receive radio waves from a plurality of position-fixing satellites with one of the antennas being used as a reference antenna, the antennas being fixed at different positions of the body, means for determining the relative positions of the other antennas with respect to the reference antenna by observing single differences of carrier phase or double differences of carrier phase between carrier phases of the radio waves and by calculating integer ambiguities of the phase differences to thereby determine the heading and/or attitude of the body, an IMU sensor installed on the body, means for obtaining attitude angles of the body based on an output of the IMU sensor, and means for determining the integer ambiguities based on the attitude angles obtained when the integer ambiguities are to be redetermined.

According to another aspect of the invention, a system for determining the heading and/or attitude of a body as described above has the said means for determining the integer ambiguities which comprises means for obtaining a baseline vector in the local coordinate system from the attitude angles obtained based on the output of the IMU sensor, means for obtaining the path difference with respect to the baseline vector, and means for obtaining the integer ambiguities based on the path difference with respect to the baseline vector and measured phase difference.

According to another aspect of the invention, a system for determining the heading and/or attitude of a body comprises two antennas which receive radio waves from a plurality of position-fixing satellites, the antennas being fixed at different positions of the body with one of the antennas being used as a reference antenna, means for determining the relative positions of the other antennas with respect to the reference antenna by observing single differences of carrier phase or double differences of carrier phase between carrier phases of the radio waves and by calculating integer ambiguities to thereby determine the heading and/or attitude of the body, an IMU sensor installed on the body, means for obtaining attitude angles of the body based on an output of the IMU sensor, and means for determining the integer ambiguities based on the attitude angles obtained from the output of the IMU sensor when the integer ambiguities are to be redetermined.

According to further aspect of the invention, a system for determining the heading and/or attitude of a body comprises a plurality of antennas which receive radio waves from a plurality of position-fixing satellites, the antennas being fixed at different positions of the body with one of the antennas being used as a reference antenna, means for determining the relative positions of the other antennas with respect to the reference antenna based on integer ambiguities of the phase differences to thereby determine the heading and/or attitude of the body, an IMU sensor installed on the body, means for obtaining attitude angles of the body from an output of the IMU sensor, and means for determining the integer ambiguities based on the attitude angles obtained from the output of the IMU sensor when the integer ambiguities are to be redetermined.

Since the integer ambiguities of the single differences of carrier phase or the double differences of carrier phase observed when calculating the relative positions of the multiple antennas are directly determined from the attitude angles of the body obtained by means of the IMU sensor in this invention, it is possible to output attitude information to the user substantially without interruption even when the combination of satellites to be used is altered or a cycle slip has occurred. Furthermore, it becomes possible to output highly reliable attitude information because the rate of correct integer ambiguity solutions increases.

DETAILED DESCRIPTION OF THE PREFERRED EMBODIMENTS OF THE INVENTION

Figure 1:
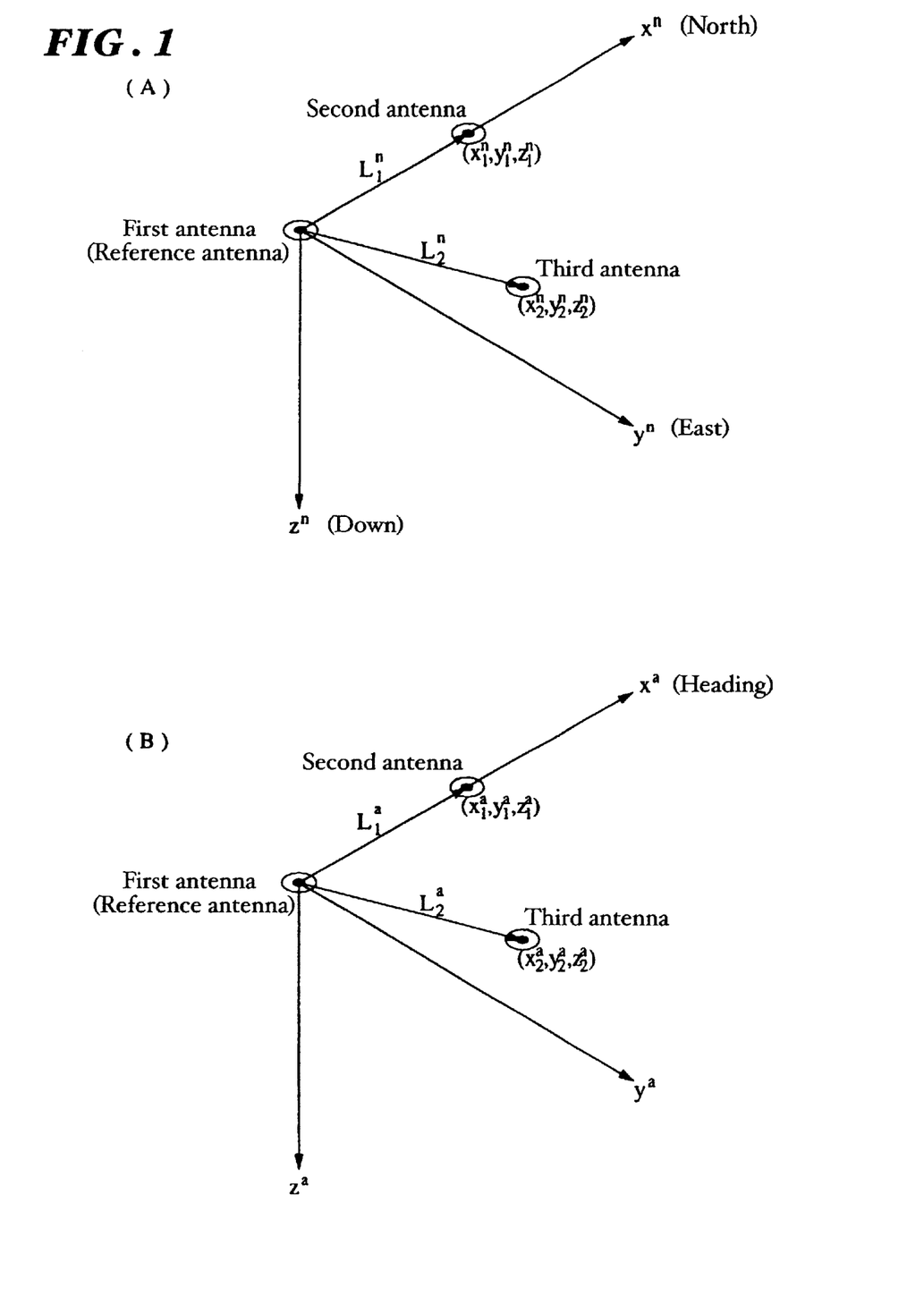
FIGS. 1A and 1B are diagrams showing an example of an antenna layout depicted in a local coordinate system and an antenna coordinate system, respectively.

First, an antenna coordinate system, a local coordinate system and coordinate transformation between these two coordinate systems are explained referring to FIGS. 1A and 1B.

FIG. 1A shows an antenna layout depicted in the local coordinate system, in which the x, y and z axes represent north, east and vertical directions, respectively, with the position of a reference antenna (first antenna) taken as an origin, for instance. In FIG. 1A, a point with coordinates $(x_1^n, y_1^n, z_1^n)$ is the position of a second antenna, a point with coordinates $(x_2^n, y_2^n, z_2^n)$ is the position of a third antenna, $L_1^n$ is a baseline vector from the first antenna to the second antenna (i.e., the vector indicating the length and direction of a straight line connecting the reference antenna chosen from multiple antennas to one of the other antennas whose relative position should be determined), and $L_2^n$ is a baseline vector from the first antenna to the third antenna. The superscript "n" written to the right of the values of the coordinates and the baseline vectors indicates that these coordinates and baseline vectors are for the local coordinate system.

FIG. 1B shows an antenna layout depicted in the antenna coordinate system, in which the x axis represents the heading (i.e., the direction in which a ship's bow or the nose of an aircraft is oriented), the y axis corresponds to a direction perpendicular to the x axis, and the z axis indicates a direction perpendicular to both the x and y axes, with the position of the reference antenna (first antenna) taken as an origin, for instance. In FIG. 1B, a point with coordinates $(x_1^a, y_1^a, z_1^a)$ is the position of the second antenna, a point with coordinates $(x_2^a, y_2^a, z_2^a)$ is the position of the third antenna, $L_1^a$ is a baseline vector from the first antenna to the second antenna, and $L_2^a$ is a baseline vector from the first antenna to the third antenna. The superscript "a" written to the right of the values of the coordinates and the baseline vectors indicates that these coordinates and baseline vectors are for the antenna coordinate system.

Equation (1) below is a transformation formula for converting coordinates from the antenna coordinate system to the local coordinate system:

(1)

where $L_3^n$ is a cross product of $L_1^n$ and $L_2^n$, and $L_3^a$ is a cross product of $L_1^a$ and $L_2^a$.

The coordinate transformation operator $C_a^n$ of equation (1) is expressed by equation (2) below:

(2)

where θr is the angle of roll (i.e., the angle of rotation about the x axis of the antenna coordinate system) a body, θp is the angle of pitch (i.e., the angle of rotation about the y axis of the antenna coordinate system), and θy is the angle of yaw (i.e., the angle of rotation about the z axis of the antenna coordinate system). These angles are obtained respectively from the following equations:

(3)

(4)

(5)

Figure 2:
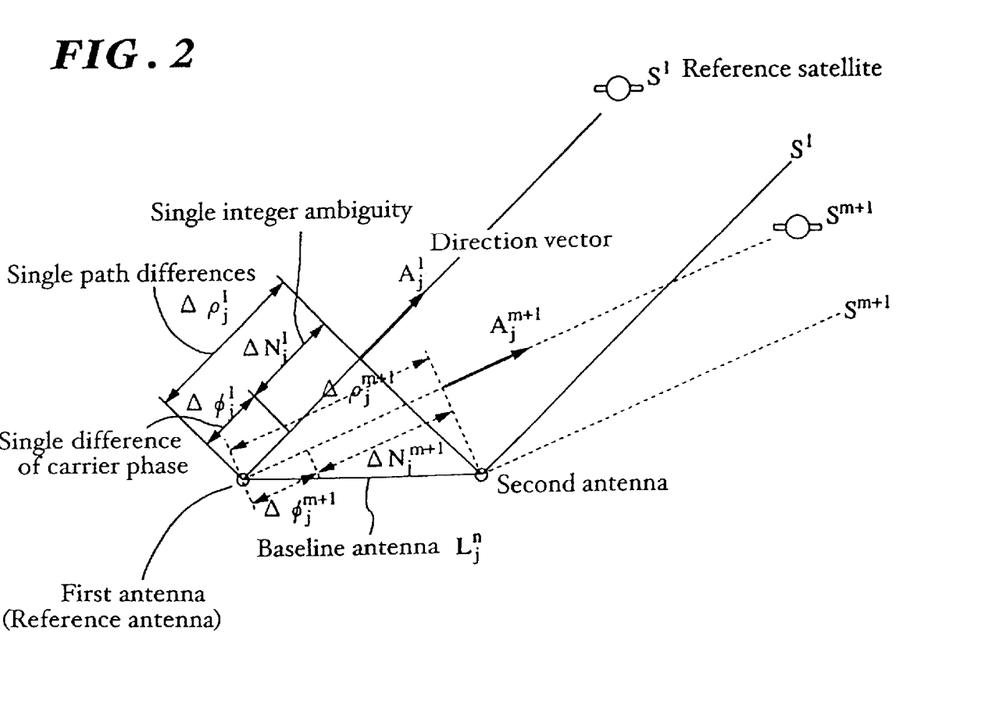
FIG. 2 is a diagram showing the relationship between baseline vectors and single differences of carrier phase, etc.

Since $L_1^a$, $L_2^a$ and $L_3^a$ of equation (1) are known quantities, $C_a^n$ can be obtained if $L_1^n$, $L_2^n$ and $L_3^n$ are determined from carrier phase difference observables. When the value of $C_a^n$ is obtained, attitude angles can be calculated by equations (3) to (5) above. Here, the angle of yaw is a direction referenced to north. Since measuring accuracy of the attitude angles is determined by the accuracy of calculation of the coordinates $(x_1^n, y_1^n, z_1^n)$ and $(x_2^n, y_2^n, z_2^n)$, an attitude determining system usually observes carrier phase differences and determines the relative positions of the antennas with high accuracy instead of performing position fixing by using a pseudorandom noise code. While either a single difference of carrier phase method or a double difference of carrier phase method may be used for position fixing, the double difference of carrier phase method is described in the following discussion:

Equation (6) below is an observation equation applicable to the double difference of carrier phase method:

(6)

where
  m: satellite No.
  k: number of satellites
  λ: carrier wavelength of a received signal
  $\delta\rho_j^n$: double path difference of a baseline vector $L_j^n$ to a reference satellite $S^1$ and a satellite $S^{m+1}$ (m=1, 2, 3)
  $\delta\phi_j^m$: double difference of carrier phase observable between the reference satellite $S^1$ and the satellite $S^{m+1}$
  $\delta N_j^m$: double integer ambiguity difference between the reference satellite $S^1$ and the satellite $S^{m+1}$
  $\delta e_j^m$: double observable noise difference between the reference satellite $S^1$ and the satellite $S^{m+1}$ FIG. 2 is a graphical representation of the double difference of carrier phase, in which individual symbols have the following meanings:
  $\Delta\rho_j^{m+1}$: single path difference of the baseline vector $L_j^n$ to the satellite $S^{m+1}$
  $\Delta\phi_j^{m+1}$: single difference of carrier phase observable of the baseline vector $L_j^n$ to the satellite $S^{m+1}$
  $\Delta N_j^{m+1}$: single integer ambiguity difference of the baseline vector $L_j^n$ to the satellite $S^{m+1}$
  $\Delta e_j^{m+1}$: single observable noise difference of the baseline vector $L_j^n$ to the satellite $S^{m+1}$ Also, the individual symbols and the aforementioned variables have the following relationship:

$$\delta\rho_j^m = \Delta\rho_j^{m+1} + \Delta\rho_j^1$$
$$\delta\phi_j^m = \Delta\phi_j^{m+1} + \Delta\phi_j^1$$
$$\delta N_j^m = \Delta N_j^{m+1} + \Delta N_j^1$$
$$\delta e_j^m = \Delta e_j^{m+1} + \Delta e_j^1$$

The double difference of carrier phase $\delta\rho_j^m$ of equation (6) can be expressed by $\delta\rho_j^m = \delta A_j^m L_j^n$ (j=1, 2), where both $\delta A_j^m$ and $L_j^n$ are functions of the coordinates $(x_1^n, y_1^n, z_1^n)$. Therefore, $\delta A_j^m$ and $L_j^n$, or the coordinates $(x_1^n, y_1^n, z_1^n)$, are unknown quantities. Since there remain three unknown quantities if integer ambiguities are predetermined by one method or other, it is possible to determine the coordinates $(x_1^n, y_1^n, z_1^n)$ if at least three observables $\delta\phi_j^m$ (i.e., the number of satellites≧4) are obtained.

Expressing now coordinate vectors of a given baseline vector L in the local coordinate system and the antenna coordinate system as defined in FIGS. 1A and 1B by $X^n$ and $X^a$, respectively, the relationship between $X^n$, $X^a$ and a coordinate transformation matrix $C_a^n$ (3×3) is expressed by equation (7) below:

$$X^n = C_a^n X^a \tag{7}$$

Thus, the variance-covariance matrix of $X^n$, $\sigma_p^2$ is given by equation (8) below:

(8)

where (9)

$H = $

Where $\sigma_p^2$ is the variance-covariance matrix of the baseline vector. $\sigma\theta^2$ is the variance-covariance matrix of the attitude angles obtained from the IMU. H is a transformation matrix between the baseline vector and the attitude angles.

The relationship between the standard deviation $\sigma_p$ of errors of the baseline vector position and the value $\delta\rho$ obtained by projecting in the direction of viewing filed of a satellite is expressed by equation (10) below:

$$\delta\rho = \delta A \sigma_p \tag{10}$$

Here, $\delta A$ is a direction cosine matrix difference taken in the direction of the satellite at the double difference of carrier phase. Provided that the standard deviation of $\delta\rho$ is $\sigma_N$, the relationship between an attitude angle error and an integer ambiguity error is expressed by equation (11) below from the aforementioned equations (8) and (10):

(11)

It is now assumed that antenna bases located at vertices of a triangle whose sides are 50 cm each are swung with a rolling angle of ±20° at rolling angle varying intervals of 60 seconds, a pitching angle of ±15° at pitching angle varying intervals of 70 seconds, and with a yawing angle of ±30° at yawing angle varying intervals of 180 seconds, and the direction of a satellite and its elevation angle are varied through 360° and between 0° and 80°, respectively. If errors of IMU sensors for sensing rolling, pitching and yawing angles are within a few degrees in terms of standard deviation under the conditions stated above, a range error calculated in the direction of viewing filed of the satellite is equal to or smaller than ¼ of the wavelength of the carrier of radio waves (i.e., approximately 5 cm) transmitted from the satellite.

This means that it is possible to obtain error-free integer ambiguities of carrier phases even when the ambiguities of the carrier phases are rounded to integers using the attitude angles obtained from outputs of the IMU sensors under the aforementioned conditions because the attitude angle error is usually a few degrees or less.

Real number ambiguities are calculated as follows from the attitude angles.

Since the position $(x_j^a, y_j^a, z_j^a)$ of a baseline vector $L_j^a$ (j=1, 2) in the antenna coordinate system is known, the position $(x_j^n, y_j^n, z_j^n)$ of the baseline vector $L_j^n$ (j=1, 2) in the local coordinate system is obtained from the attitude angles detected by the IMU sensors using equations (2) and (7).

Single difference of carrier phase $\Delta\rho_j^m$ of each satellite is calculated backward from the position $(x_j^n, y_j^n, z_j^n)$ using equation (12) below:

(m = 1, 2, 3, 4, j = 1, 2)

(12)

Since $A_j^m$ is a vector in the direction of viewing filed of a satellite m of the baseline vector $L_j^n$, it can be determined from the position $(x_m^n, y_m^n, z_m^n)$ of each satellite and the position $(x_j^n, y_j^n, z_j^n)$ in the local coordinate system, where m is the number of the used satellite and j is the number of the baseline vector.

Since the observation equation of the single difference of carrier phase expressed by equation (13) below, it is possible to calculate real number ambiguity $\Delta N_j^m$ of the single difference of carrier phase for the satellite m if the single difference of carrier phase $\Delta\phi_j^m$ is an observable:

(m = 1, 2, 3, 4, j = 1, 2)

(13)

where a value obtained by rounding $\Delta N_j^m$ to an integer is the integer ambiguity (single integer ambiguity difference).

In the case of the double difference of carrier phase method, it is possible to calculate a double difference of carrier phase real number ambiguity $\delta N_j^m$ from the aforementioned equation (6). Therefore, the invention is applicable to either the single difference of carrier phase method or the double difference of carrier phase method. It is to be noted that in the same way the invention can be applicable to one of any other numbers used for "j".

Now, the construction of the present attitude determining system for a body is described with reference to FIGS. 3 and 4.

Figure 3:
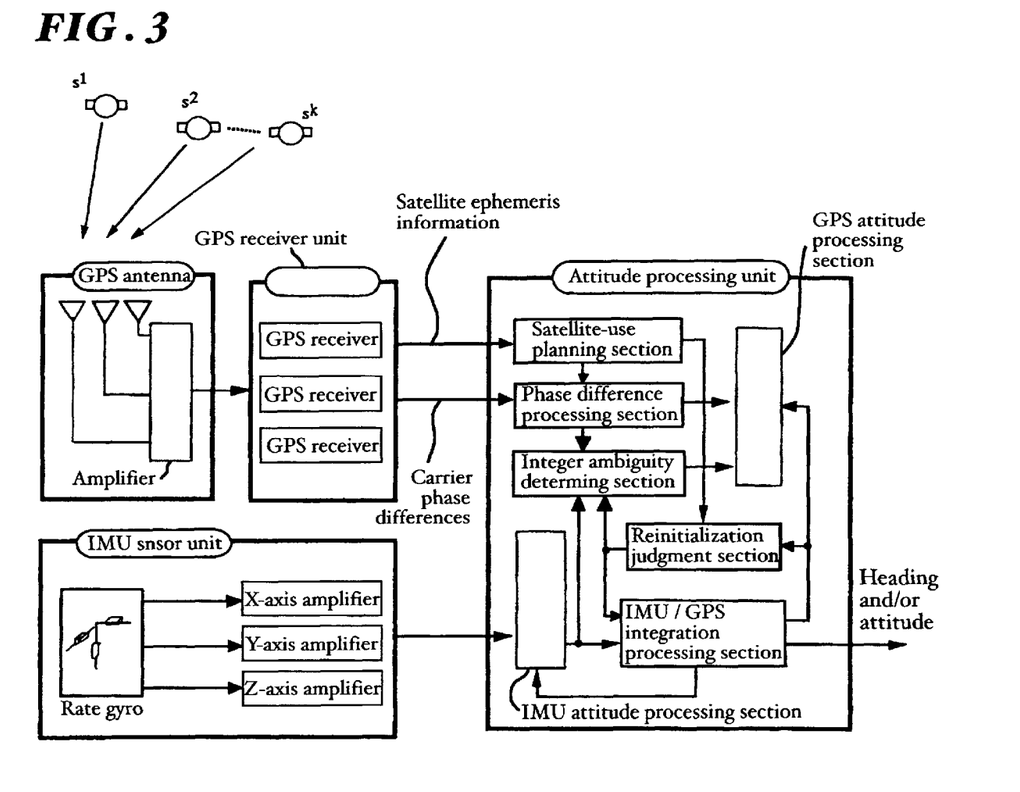
FIG. 3 is a block diagram showing the construction of an attitude determining system for a body according to the present invention.

FIG. 3 is a block diagram of the attitude determining system. Designated by s1, s2, . . . sk in FIG. 3 are satellites of the Global Positioning System (GPS). GPS antennas receive radio waves from the multiple satellites, convert received signals into intermediate frequency (IF) signals, and amplify the IF signals. A GPS receiver calculates antenna positions and carrier phase differences from the signals received by the individual antennas and outputs these data together with information on the positions of the individual satellites to an attitude data processing block at specific time intervals (i.e., a few tens of milliseconds to a few seconds). Since the satellite positions obtained by position fixing, ephemeris information, etc. comply with the coordinate system of the GPS, these data are converted into the local coordinate system in the GPS receiver block or in the attitude data processing block. In the following discussion, it is assumed that the data are converted in the GPS receiver block.

A satellite-use planning section of the attitude data processing block selects satellites to be used based on the satellite ephemeris information and the antenna positions and gives the antenna positions and information on the selected satellites to a phase difference processing section. The phase difference processing section calculates observed quantities of single (or double) phase differences from carrier phase difference signals received from the GPS receiver block and delivers the resultant data to an integer ambiguity determination section. The integer ambiguity determining section determines integer ambiguities of the single (or double) phase differences of the relevant satellites, evaluates the goodness of the integer ambiguities, and gives integer ambiguity information to a GPS attitude processing section. The GPS attitude processing section calculates baseline vectors in the local coordinate system from the integer ambiguities and carrier phase difference observables output from the phase difference processing section using a known method. Attitude angles are calculated from the baseline vectors for the local coordinate system thus obtained and the known baseline vectors for the antenna coordinate system from equations (1) to (5). The attitude angles obtained by the GPS are hereinafter referred to as "GPS attitude angles."

Referring to FIG. 3, an IMU sensor block includes a rate gyro for detecting angular velocities around three perpendicular axes as well as an x-axis amplifier, y-axis amplifier and z-axis amplifier for amplifying angular velocity outputs. This IMU sensor block outputs data on the angular velocities around the individual axes to an IMU attitude processing section of the attitude data processing block. More specifically, the IMU sensor block outputs angular velocities $\omega_{is}^s$ about axes of an IMU sensor coordinate system referenced to a right-handed inertial coordinate system whose x axis coincides with the line of intersection of the earth's equatorial plane and a meridian plane passing through the vernal equinox and y axis coincides with an eastward-directed line perpendicular to the x axis. What are needed here are angular velocities $\omega_{ns}^s$ about coordinate axes of the IMU sensors in the local coordinate system. The relationship between $\omega_{is}^s$ and $\omega_{ns}^s$ is given by $\omega_{ns}^s = \omega_{is}^s - \omega_{in}^s$, where $\omega_{in}^s$ in is an angular velocity obtained when an angular velocity in the local coordinate system referenced to the inertial coordinate system is measured from the IMU sensor coordinate system. Since $\omega^s_{is} \gg \omega^s_{in}$ in the case of a low-speed body like a ship, $\omega^s_{is}$ may be disregarded. In the case of a high-speed body like an aircraft, $\omega^s_{ns}$ is calculated from the position of the body using a known method.

The IMU attitude processing section calculates the attitude angles using Euler's equation or Gilmore's algorithm which are known. The attitude angles thus obtained are hereinafter referred to as "IMU attitude angles."

An IMU/GPS integration processing section combines the IMU attitude angles and the GPS attitude angles and outputs individual attitude angles including the angles of roll, pitch and yaw.

Figure 4:
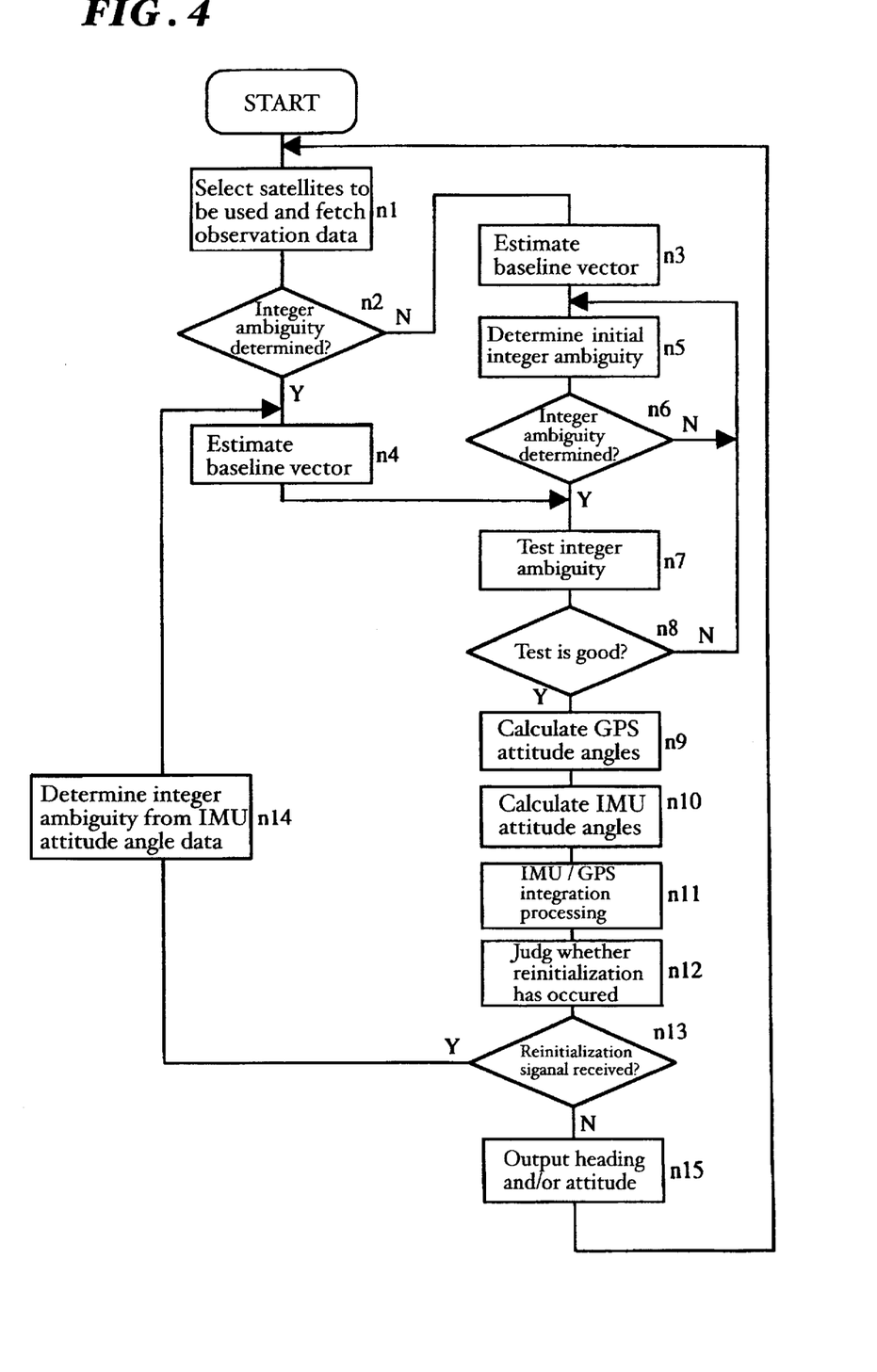
FIG. 4 is a flowchart showing operations performed by a reinitialization judgment section and an IMU/GPS integration processing section of an attitude data processing block shown in FIG. 3.

FIG. 4 is a flowchart showing operations performed by a reinitialization judgment section and the IMU/GPS integration processing section of the attitude data processing block shown in FIG. 3. First, the attitude data processing block selects satellites to be used for position fixing and takes in observation data obtained by receiving radio waves from the selected satellites (step n1). If integer ambiguities are not determined yet under initial conditions, baseline vectors are estimated (real number solutions are determined) for the individual antennas. A Kalman filter or the least squares method, for instance, is used for this estimation. Subsequently, the integer ambiguities are determined by rounding the real number solutions to integers using a known method (steps n2→n3→n5→n6→n5 . . . ).

Next, the goodness of the estimated integer ambiguities is verified by conducting a $\chi^2$-test or by judging whether baseline lengths coincide with actual values (step n7). If the result of verification is unsatisfactory, the aforementioned operation for determining the integer ambiguities is reexecuted (steps n8→n5 . . . ). If the result of verification is satisfactory, baseline vectors are calculated using the obtained integer ambiguities as known quantities, and GPS attitude angles are calculated from relative positions of the individual antennas (step n9). Then, IMU attitude angles are calculated from angular velocities around the three axes detected by the IMU sensors at the same time that the GPS attitude angles were calculated (step n10).

Next, the GPS attitude angles and the IMU attitude angles are combined. Specifically, the IMU attitude angles are converted to attitude angles defined in the same local coordinate system as for the GPS attitude angles by using the GPS attitude angles as initial values of a strap-down of the IMU sensor block. Also, IMU sensor errors are estimated from differences between the GPS attitude angles and the IMU attitude angles (step n11).

The GPS attitude angles are attitude angles of the axes of the antenna coordinate system referenced to the local coordinate system, and the IMU attitude angles are attitude angles of the axes of the IMU sensor coordinate system referenced to the local coordinate system. Although it is desirable to install the antennas and IMU sensors on the body such that the axes of the antenna coordinate system and the axes of the IMU sensor coordinate system exactly match each other, this is difficult in practice. Accordingly, a deviation of the coordinate axes is compensated for by a mathematical operation involving rotation of the coordinate axes.

The aforementioned estimation of the IMU sensor errors is made by estimating ambiguity and drift errors which constitute the IMU sensor errors using information on the differences between the GPS attitude angles and the IMU attitude angles. The IMU sensor errors thus estimated are removed from the IMU attitude angles.

Subsequently, the reinitialization judgment section of the attitude data processing block judges whether any cycle slip has occurred. If no cycle slip has occurred, the attitude data processing block outputs the obtained attitude angles (steps n12→n13→n15).

When the occurrence of a cycle slip has been detected, the integer ambiguities are directly determined from IMU attitude angle data by the aforementioned method and the baseline vectors are determined from the integer ambiguities (steps n13→n14→n4). This estimation of the baseline vectors in step n4 and the estimation of the baseline vectors in step n3 differ in that the number of states in the baseline vector estimation in step n3 is three (x, y, z) plus m number of ambiguities whereas the number of states in the baseline vector estimation in step n4 is three only (x, y, z) in a case where a Kalman filter is used, for instance. Therefore, computational complexity of the baseline vector estimation in step n4 is rather small so that the baseline vectors can be estimated in an extremely short period of time.

From this time onward, the attitude data processing block carries out the aforementioned verification of the goodness of the estimated integer ambiguities in step n7 and the later operations (steps n7→n8 . . . ).

Since no error usually occurs in the integer ambiguities determined in step N14, the operation flow may proceed from step n4 to step n9, skipping steps n7 and n8.

Since the integer ambiguities are directly determined from the IMU attitude angle data as stated above when system reinitialization has become necessary due to cycle slips or a change in the combination of satellites to be used, for instance, it is not necessary to spend a long period of time for determining the integer ambiguities. As a consequence, it is possible to output the attitude angles of the body to be used for determining the integer ambiguities substantially without interruption and thereby provide a user with highly accurate attitude angle information continuously.

What is claimed is:

1. A system for determining the heading and/or attitude of a body, said system comprising:
   at least three antennas which receive radio waves from a plurality of position-fixing satellites with one of the antennas being used as a reference antenna, the antennas being fixed at different positions of the body;
   means for determining the relative positions of the other antennas with respect to the reference antenna by observing single differences of carrier phase or double differences of carrier phase between carrier phases of the radio waves and by calculating integer ambiguities of the phase differences to thereby determine the heading and/or attitude of the body;
   an IMU sensor installed on the body;
   means for obtaining attitude angles of the body based on an output of the IMU sensor; and
   means for determining the integer ambiguities based on the attitude angles obtained when the integer ambiguities are to be redetermined.

2. A system for determining the heading and/or attitude of a body as defined in claim 1 wherein said means for determining the integer ambiguities comprises means for obtaining a baseline vector in the local coordinate system from the attitude angles obtained based on the output of the IMU sensor, means for obtaining the path difference with respect to the baseline vector, and means for obtaining the integer ambiguities based on the path difference with respect to the baseline vector and measured phase difference.

3. A system for determining the heading and/or attitude of a body, said system comprising:

two antennas which receive radio waves from a plurality of position-fixing satellites, the antennas being fixed at different positions of the body with one of the antennas being used as a reference antenna;

means for determining the relative positions of the other antennas with respect to the reference antenna by observing single differences of carrier phase or double differences of carrier phase between carrier phases of the radio waves and by calculating integer ambiguities to thereby determine the heading and/or attitude of the body;

an IMU sensor installed on the body;

means for obtaining attitude angles of the body based on an output of the IMU sensor; and means for determining the integer ambiguities based on the attitude angles obtained from the output of the IMU sensor when the integer ambiguities are to be redetermined.

4. A system for determining the heading and/or attitude of a body, said system comprising:

a plurality of antennas which receive radio waves from a plurality of position-fixing satellites, the antennas being fixed at different positions of the body with one of the antennas being used as a reference antenna;

means for determining the relative positions of the other antennas with respect to the reference antenna based on integer ambiguities of the phase differences to thereby determine the heading and/or attitude of the body;

an IMU sensor installed on the body;

means for obtaining attitude angles of the body from an output of the IMU sensor; and means for determining the integer ambiguities based on the attitude angles obtained from the output of the IMU sensor when the integer ambiguities are to be redetermined.

* * * * *

UNITED STATES PATENT AND TRADEMARK OFFICE
CERTIFICATE OF CORRECTION

PATENT NO. : 6,424,915 B1
DATED : July 23, 2002
INVENTOR(S) : Fukuda et al.

It is certified that error appears in the above-identified patent and that said Letters Patent is hereby corrected as shown below:

Column 4,
Change equation (1) from "X" to:

$$-- \begin{bmatrix} L_1^n \\ L_2^n \\ L_3^n \end{bmatrix} = C_a^n \begin{bmatrix} L_1^a \\ L_2^a \\ L_3^a \end{bmatrix} \quad \text{......(1)} --$$

Change equation (2) from "X" to:

$$-- C_a^n = \begin{bmatrix} \cos(\theta_p)\cos(\theta_y) & \begin{array}{c}\sin(\theta_r)\sin(\theta_p)\cos(\theta_y)\\-\cos(\theta_r)\sin(\theta_y)\end{array} & \begin{array}{c}\cos(\theta_r)\sin(\theta_p)\cos(\theta_y)\\+\sin(\theta_r)\sin(\theta_p)\end{array} \\ \cos(\theta_p)\cos(\theta_y) & \begin{array}{c}\sin(\theta_r)\sin(\theta_p)\sin(\theta_y)\\+\cos(\theta_r)\cos(\theta_y)\end{array} & \begin{array}{c}\cos(\theta_r)\sin(\theta_p)\sin(\theta_y)\\-\sin(\theta_r)\cos(\theta_p)\end{array} \\ -\sin(\theta_p) & \sin(\theta_r)\cos(\theta_p) & \cos(\theta_r)\cos(\theta_p) \end{bmatrix} \quad (2) --$$

Column 5,
Change equations (3), (4), and (5) from "X" to:

$$-- \text{Roll}: \theta_r = \tan^{-1}\left[\frac{C_a^n(3,2)}{C_a^n(3,3)}\right] \quad \text{......(3)} --$$

$$-- \text{Pitch}: \theta_p = \sin^{-1}\left[C_a^n(3,1)\right] \quad \text{......(4)} --$$

$$-- \text{Yaw}: \theta_y = \tan^{-1}\left[\frac{C_a^n(2,1)}{C_a^n(1,1)}\right] \quad \text{......(5)} --$$

Change equation (6) from "X" to:

$$-- \lambda\delta\phi_j^m = \lambda\rho_j^m - \lambda\delta N_j^m + \delta e_j^m \quad (m = 1,2,....k) ....... (6) --$$

UNITED STATES PATENT AND TRADEMARK OFFICE
CERTIFICATE OF CORRECTION

PATENT NO. : 6,424,915 B1
DATED : July 23, 2002
INVENTOR(S) : Fukuda et al.

It is certified that error appears in the above-identified patent and that said Letters Patent is hereby corrected as shown below:

Column 6 cont'd,
Change equation (8) from "X" to:

$$-- \sigma_p^2 = H\sigma_\theta^2 H^T \quad\quad (8) --$$

Change equation (9) (lines 36-49) from "X"s to:

$$-- \sigma_p^2 = \begin{bmatrix} \sigma_{xx}^2 & \sigma_{xy}^2 & \sigma_{xz}^2 \\ \sigma_{yx}^2 & \sigma_{yy}^2 & \sigma_{yz}^2 \\ \sigma_{zx}^2 & \sigma_{zy}^2 & \sigma_{zz}^2 \end{bmatrix}$$

$$\sigma_\theta^2 = \begin{bmatrix} \sigma_r^2 & \sigma_{rp}^2 & \sigma_{ry}^2 \\ \sigma_{pr}^2 & \sigma_p^2 & \sigma_{py}^2 \\ \sigma_{yr}^2 & \sigma_{yp}^2 & \sigma_y^2 \end{bmatrix}$$

$$H = \begin{bmatrix} \frac{\partial C_a^n}{\partial \theta_r} X^a & \frac{\partial C_a^n}{\partial \theta_p} X^a & \frac{\partial C_a^n}{\partial \theta_y} X^a \end{bmatrix} \quad\quad (9) --$$

Column 7,
Change equation (11) from "X" to:

$$-- \sigma_N^2 = \delta A H \sigma_\theta^2 H^T (\delta A)^T \quad\quad (11) --$$

Change equation (12) from "X" to:

$$-- \Delta \rho_j^{\,m} = A_j^{\,m} X_j^{\,n} \quad (m = 1,2,3,4, j = 1, 2) \quad\quad (12) --$$

UNITED STATES PATENT AND TRADEMARK OFFICE
CERTIFICATE OF CORRECTION

PATENT NO.    : 6,424,915 B1
DATED         : July 23, 2002
INVENTOR(S)   : Fukuda et al.

It is certified that error appears in the above-identified patent and that said Letters Patent is hereby corrected as shown below:

<u>Column 7, cont'd,</u>
Change equation (13) from "X" to:

$$-- \lambda \Delta N_j^m = \Delta \rho_j^m - \lambda \Delta \phi_j^m + \Delta e_j^m \quad (m = 1, 2, 3, 4, j = 1, 2) \qquad (13) --$$

Signed and Sealed this

Twenty-second Day of July, 2003

JAMES E. ROGAN
*Director of the United States Patent and Trademark Office*